June 4, 1963 W. STEIGER 3,092,753

MAGNETIC DEFLECTION APPARATUS FOR CATHODE RAY TYPE TUBE

Filed Jan. 15, 1962

INVENTOR.
WERNER STEIGER,
BY Robert H. Hines
ATTORNEY.

United States Patent Office 3,092,753
Patented June 4, 1963

3,092,753

MAGNETIC DEFLECTION APPARATUS FOR CATHODE RAY TYPE TUBE

Werner Steiger, Newport Beach, Calif., assignor to Hughes Aircraft Company, Culver City, Calif., a corporation of Delaware Filed Jan. 15, 1962, Ser. No. 166,330
8 Claims. (Cl. 315—27)

This invention relates to an apparatus for driving push-pull type deflection yokes on cathode ray type tubes and, more particularly, to an apparatus capable of effecting fast operation of push-pull type magnetic deflection yokes with driver units that operate at a comparatively low average power dissipation therein.

In conventional deflection apparatus employing yokes, it is the current flow through the yoke which produces the magnetic field which, in turn, deflects the electron beam. Thus, in situations where it is desired to achieve extremely fast deflection, it is necessary to change the current flow through the yoke in a very short interval of time. An inherent characteristic of all yokes, however, is that they all possess some finite value of inductance. In situations where the deflection is periodic in nature, resonant circuit techniques may be employed to neutralize the inductance of the yokes. In other situations it has been the practice to employ a large supply voltage to overcome the inductive reactance of the yoke thereby to produce desired changes in current flow in sufficiently short intervals of time. Thus, it is necessary that the transistors of the output stage be capable of dissipating an amount of energy determined by the large supply voltage and the maximum current flow. This latter capability is extremely difficult to realize in fast deflection systems since this dissipation is inversely proportional to the desired large-signal deflection speed.

It is therefore an object of th present invention to provide an improved high-speed linear magnetic deflection system.

Another object of the present invention is to provide a magnetic deflection system incorporating a transistor output stage having minimum power dissipation therein.

Still another object of the present invention is to provide a magnetic deflection system which develops a voltage proportional to the deflection of the electron beam for feedback purposes.

A further object of the present invention is to provide a deflection system which automatically limits the average power dissipation in the output transistor to a safe value.

A still further object of the present invention is to provide a deflection system incorporating a transistor output stage designed to apply high voltage across the yoke windings during transient periods without requiring a comparable rate of energy dissipation in the output transistors during quiescent conditions.

In accordance with the present invention, a differential amplifier having either a transistor or tube output stage is employed to drive a push-pull yoke. A push-pull yoke is a yoke having negative mutual coupling between the two windings thereof. The output stage of the differential amplifier is connected to extremities of unlike polarity of the two yoke coils, the remaining extremities of which are connected through similarly poled high-inductance windings of a transformer having substantially a unity coupling coefficient, and through resistors of substantially equal ohmic value to ground. During quiescent periods of operation, energy is stored in the transformer. At instances when fast deflection of the electron beam is indicated, energy stored in the transformer transfers to the yoke. Also, voltages proportional to the deflection of the electron beam suitable for feedback purposes are developed across the resistors of substantially equal ohmic value. These voltages are fed back to the input of the differential amplifier thereby to achieve linear deflection of the electron beam. In addition to the foregoing, the disclosed embodiment incorporates a low-inductance high-current push-pull deflection yoke to increase still further the deflection speeds which may be realized by the apparatus of the present invention.

The above-mentioned and other features and objects of this invention and the manner of obtaining them will become more apparent by reference to the following description taken in conjunction with the accompanying drawings, wherein.

Figure 1:
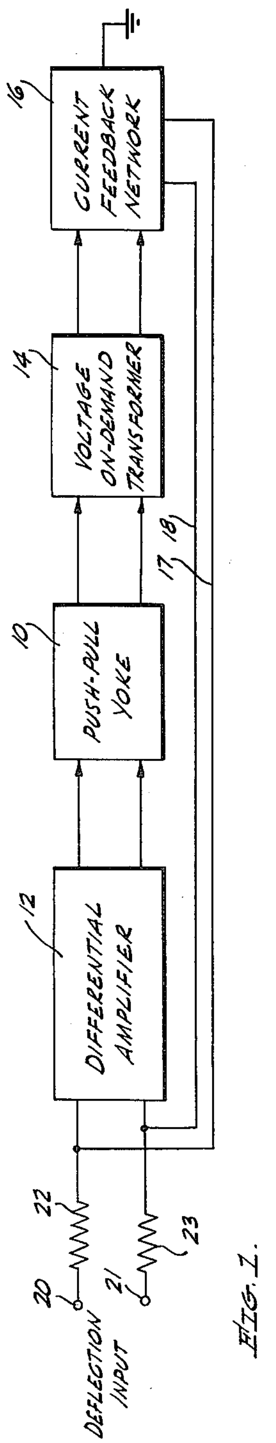
FIGURE 1 is a block flow diagram of an embodiment of the present invention.

Referring now to FIG. 1 of the drawings, a preferred embodiment of the invention includes a push-pull yoke 10 which is driven with the outputs from a differential amplifier 12. The push-pull yoke 10 is, in turn, connected through a "voltage-on-demand" transformer 14 to the inputs of a current-feedback network 16 which is referenced to a source of substantially fixed potential, such as, for example, ground. The current feedback network 16 develops feedback signals which are connected over leads 17, 18 to the inputs to the differential amplifier 12. Lastly, sweep input terminals 20, 21, the latter of which is referenced to ground, are connected through resistors 22, 23, respectively, to the leads 17, 18 at the input of the differential amplifier 12.

Figure 2:
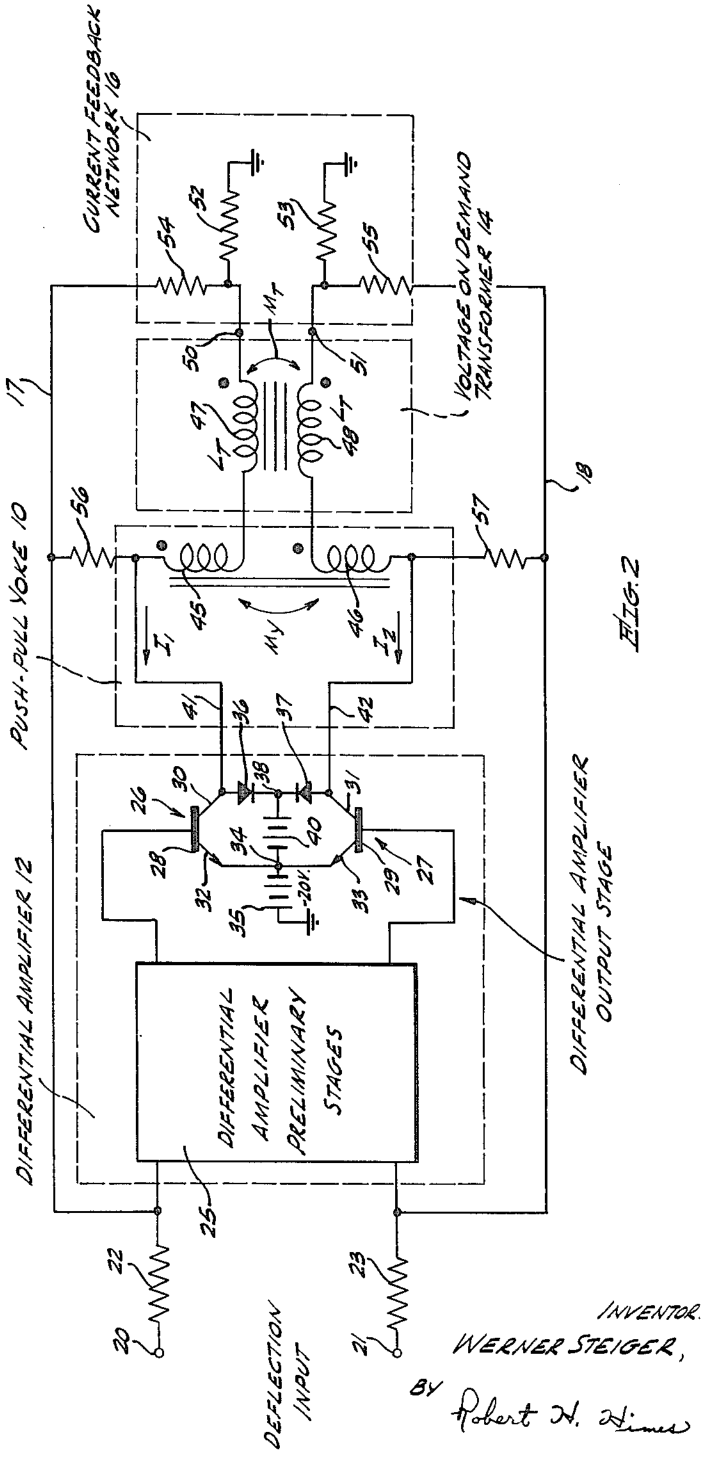
FIG. 2 is a schematic circuit diagram of the apparatus of FIG. 1.

Referring now to FIG. 2 of the drawings wherein like reference characters designate like elements, there is shown a more detailed schematic circuit diagram of an embodiment of the apparatus of FIG. 1 which is capable of achieving extremely fast electron beam deflections. In particular, differential amplifier 12 includes preamplifier stages 25 which, in turn, drive n-p-n type output transistors 26, 27. The output transistors 26, 27 have bases 28, 29, collectors 30, 31 and emitters 32, 33, respectively, and are of a type adapted to conduct an average current of the order of 3 amperes and operate through a range from 1 to 5 amperes. An n-p-n transistor of this type has been designated commercially as a "TA2110" transistor. It is, of course, understood that other types of transistors with appropriate characteristics can also be employed in which case operating levels of voltage and currents would be chosen accordingly. The output connections from the preamplifier stages 25 are connected to the bases 28, 29 of the transistors 26, 27, respectively; the emitters 32, 33 thereof are connected to a common junction 34 which is maintained at a potential of the order of —20 volts relative to ground by means of a connection from the negative terminal of a battery 35, the positive terminal of which is referenced to ground. Further, the collectors 30, 31 are connected through diodes 36, 37, respectively, to a common junction 38, which common junction 38 is maintained at a potential that is less than the breakdown voltage of the transistors 26, 27 and which may, for TA2110 type transistors, be as high as +300 volts relative to the potential of common junction 34. This potential is applied across junctions 38, 34 by means of a connection from the positive terminal of a battery 40 to the junction 38 and a connection from the negative terminal thereof to the junction 34. The diodes 36, 37 are each poled to allow current flow towards the junction 38. Leads 41, 42 connected directly to the collectors 30, 31, respectively, of the transistors 26, 27, constitute an output from the differential amplifier 12.

The push-pull yoke 10 includes coils 45, 46, each of which have an inductance, $L_y$, which preferably is as low as possible consistent with the capability of producing efficient deflection with reasonable values of current. An inductance, $L_y$, of 80 microhenries has been employed in the present embodiment. Also, the coils 45, 46 have a common magnetic circuit whereby the mutual inductance, $M_y$, therebetween is negative and may approach $L_y$ in magnitude. An extremity of the coil 45 is connected to the output lead 41 of the differential amplifier 12 and an extremity of the coil 46 is of opposite polarity connected to the output lead 42 of the differential amplifier 12. Thus, the polarity of the coils 45, 46 of push-pull yoke 10 in proceeding from output lead 41 to output lead 42 of differential amplifier 12 is in the same direction whereby the magnetic field available for deflecting the electron beam represents the difference in the magnetic flux generated by the respective currents flowing through the coils 45, 46 of yoke 10.

Next, the "voltage-on-demand" transformer 14 includes windings 47, 48 which have equal numbers of turns, each of which have an inductance, $L_T$, which is considerably larger than $L_y$, typically 10 to 100 times $L_y$. Two factors determine the choice of the practical value of this ratio, namely, the peak energy which the output transistors 26, 27 are capable of handling and the stray inductance of the transformer 14. This stray inductance should be small compared with the yoke inductance, $L_y$, so as not to decrease the bandwidth. It is thus apparent that the coupling coefficient of the windings 45, 46 of the transformer 14 be as near unity as possible. A corresponding extremity of each of the windings 47, 48 of transformer 14 which are of like polarity are connected to the remaining extremities of the yoke windings 45, 46, respectively. Further, the remaining extremities of the windings 47, 48 of transformer 14 are connected to input terminals 50, 51, respectively, of the current feedback network 16.

The current feedback network 16 includes resistors 52, 53 connected from the input terminals 50, 51, respectively, to ground, and resistors 54, 55 connected from input terminals 05, 51, respectively, to the feedback leads 17, 18. The ohmic value of resistors 52, 53 is sufficiently small so as to dissipate less power and yet is of sufficient magnitude to produce an accurate measure of the deflection signal. An ohmic value as small as 1 ohm has been found to be of adequate size in the present embodiment. Lastly, to further stabilize the feedback system, resistors 56, 57 are connected from the output leads 41, 42, respectively, of the differential amplifier 12 to the feedback leads 17, 18 which are connected to the input terminals thereof. This latter connection provides negative feedback of the yoke voltages which is desirable for active damping of the resonance circuit formed by the yoke 10 and associated stray capacitances.

During quiescent operation of the apparatus of the present invention, there is substantially zero voltage relative to ground at the sweep input terminal 20 whereby output currents, $I_1$, $I_2$, flowing through the output transistors 26, 27, respectively, are substantially equal and may, for example, be of the order of three amperes. Inasmuch as the net magnetic flux produced by the currents, $I_1$ and $I_2$, flowing through yoke coil windings 45, 46 equals the difference in the magnetic flux produced by individual currents, $I_1$ and $I_2$, equal currents, $I_1$ and $I_2$, correspond to a net magnetic flux of substantially zero. This condition, of course, corresponds to zero deflection of the electron beam. Also, the magnetic field produced by the flow of the currents, $I_1$ and $I_2$, through the windings 47, 48 of the "voltage-on-demand" transformer 14 constitutes a source of potential energy. In addition, in that the ohmic value of the resistors 52, 53 is substantially equal, equal current flow therethrough corresponds to zero voltage across the terminals 50, 51 whereby the feedback signal applied to the inputs of the differential amplifier 12 over the leads 17, 18 remains substantially zero.

Application of a deflection signal to the sweep input terminal 20, however, changes the relative magnitude of the currents, $I_1$ and $I_2$, flowing through the output transistors 26, 27, respectively. Irrespective of the rate of increase of the deflection signal, however, the maximum possible deflection rate of the electron beam in limited by the inductance, $L_y$, of each of the yoke windings 45, 46. Since the windings 45, 46 are connected with the mutual inductance, $M_y$, negative, the net effect of the inductance of the yoke 10 is to tend to maintain the current difference $(I_2-I_1)$, constant. Thus, whenever sudden large deflections are demanded, the difference amplifier 12 is overdriven because the desired yoke currents, $I_1$, $I_2$, and the concomitant feedback signal does not develop immediately. Accordingly, one of the output transistors 26, 27 saturates and the remaining output transistor cuts off until the desired deflection of the electron beam is substantially realized at which time the negative feedback signals developed by the current-feedback network 16 returns the differential amplifier 12 to its active region. Thus, in instances where there is maximum large-signal deflection speed, the output transistors 26, 27 function as switches.

By way of example, assume that a sweep signal is applied to sweep input terminal 20 which requires $I_1$ to decrease and $I_2$ to increase to the extent that output transistor 26 cuts off and output transistor 27 saturates. If the saturation resistance of output transistor 27 is small, the voltage drop thereacross is essentially zero. Thus, in the absence of the "voltage-on-demand" transformer 14, the winding 46 of the yoke 10 would be connected directly across the battery 35 in series with the resistor 53. Winding 45, on the other hand, would become open-circuited, whereby $I_1$ would decrease to zero amperes. Under these circumstances, the deflection rate of the electron beam would, therefore, be proportional to the rate of change of the current $I_2$ which is approximately equal to the voltage developed by the battery 35 divided by the inductance, $L_y$, of the yoke winding 46 provided the resistance in series therewith is sufficiently small so that it may be neglected.

The "voltage-on-demand" transformer 14 connected in accordance with the teachings of the present specification, however, changes the above result. For the purposes of illustration, assume that the mutual inductance, $M_t$, equals the inductance, $L_t$, of each of the windings 47, 48 of the transmformer 14, and the mutual inductance, $M_y$, is equal to the inductance, $L_y$, of the windings 45, 46 of the yoke 10, and the ohmic value of the resistors 52, 53 is small. As is inherent in any inductance, the transformer 14 tends to keep the sum of the two yoke currents, $I_1$ and $I_2$, constant. The yoke 10, however, opposes this since it wants to keep the difference between the two yoke currents $(I_2-I_1)$, constant. The transformer, therefore, develops a large voltage thereacross, namely, $$L_T\frac{d(I_1+I_2)}{dt}$$

i.e., $L_T$ times the derivative with respect to time of $(I_1+I_2)$, which voltage essentially appears in series with the voltage developed by battery 35. If this induced voltage reaches half the clamping voltage developed by battery 40, the collector of transistor 27 is clamped by the diode 37 whereby the rate the current difference $(I_2-I_1)$ changes is equal to the voltage developed by battery 40 divided by two times the inductance of the yoke 10. Consequently, it is apparent that the "voltage-on-demand" transformer 14 improves the deflection speed by a factor equal to one-half the voltage developed by battery 40 divided by the voltage developed by battery 35. In effect, the transformer 14 automatically increases the effective supply voltage in accordance with varying requirements of deflection signals. In the absence of clamping by the diodes 36, 37, the result is similar but is more difficult to analyze than the circumstances described above.

Inasmuch as energy stored in the transformer 14 is responsible for the improvement in deflection speed, the deflection program for the electron beam should necessarily be such that the transformer 14 has a long term possibility of remaining sufficiently charged by restoring its energy during idling periods. This may be regarded as an advantage rather than a limitation in that the principal reason for employing a circuit in accordance with the teachings of the present specification is because the circuit allows the use of output transistors 26, 27 which cannot continuously handle the power for operating at the desired maximum speed. Thus, an arrangement such as described above which inherently limits the average power dissipation is desirable. If successive deflections of the electron beam are sufficiently close together whereby the transformer 14 does not receive an opportunity to recharge, i.e., current flow therethrough will not have time to resume. In this latter case, the high-voltage normally developed across the transformer 14 during deflection will no longer develop. In this respect, however, the apparatus of the present invention includes an automatic protection which limits the average power dissipation of the transistors 26, 27.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for magnetically deflecting the electron beam of a cathode-ray type tube, said apparatus comprising:

(*a*) a push-pull deflection yoke having first and second pairs of terminals and first and second windings connected from said first pair of terminals to said second pair of terminals;

(*b*) a transformer having third and fourth windings connected from said second pair of terminals of said push-pull deflection yoke to a source of substantially fixed potential, said third and fourth windings being poled in the same direction whereby the mutual inductance therebetween is positive; and (*c*) means including a differential amplifier connected to said first pair of terminals of said push-pull deflection yoke and responsive to a deflection signal for producing a difference in current flow through said first and second windings of said push-pull deflection yoke and through said third and fourth windings of said transformer thereby to deflect said electron beam in accordance with said deflection signal.

2. An apparatus for magnetically deflecting the electron beam of a cathode-ray type tube, said apparatus comprising:

(*a*) a push-pull deflection yoke having first and second pairs of terminals and first and second windings connected from said first pair of terminals to said second pair of terminals;

(*b*) first and second resistors of equal ohmic value, each having one extremity thereof connected to a source of substantially fixed reference potential;

(*c*) a transformer having third and fourth windings connected from said second pair of terminals of said push-pull deflection yoke to the respective remaining extremities of said first and second resistors, said third and fourth windings being poled in the same direction whereby the mutual inductance therebetween is positive; and (*d*) means including a differential amplifier connected to said first pair of terminals of said push-pull deflection yoke and responsive to a deflection signal for producing a difference in current flow through said first and second windings of said push-pull deflection yoke and through said third and fourth windings of said transformer and said first and second resistors thereby to deflect said electron beam in accordance with said deflection signal and produce a signal proportional to the actual deflection of the electron beam between said remaining extremities of said first and second resistors.

3. The apparatus for magnetically deflecting the electron beam of a cathode-ray type tube as defined in claim 2 which additionally includes third and fourth resistors connected respectively from said remaining extremities of said first and second resistors to the input of said differential amplifier thereby to provide negative feedback in proportion to the actual deflection of said electron beam.

4. An apparatus for magnetically deflecting the electron beam of a cathode-ray type tube, said apparatus comprising:

(*a*) a push-pull deflection yoke having first and second pairs of terminals and first and second windings connected from said first pair of terminals to said second pair of terminals, said first and second windings having a predetermined self-inductance;

(*b*) first and second resistors of equal ohmic value, each having one extremity thereof connected to a source of substantially fixed reference potential;

(*c*) a transformer having third and fourth windings connected from said second pair of terminals of said push-pull deflection yoke to respective remaining extremities of said first and second resistors, said third and fourth windings each having a self-inductance that is no less than said predetermined self-inductance and being poled in the same direction whereby the mutual inductance therebetween is positive; and (*d*) means including a differential amplifier connected to said first pair of terminals of said push-pull deflection yoke and responsive to a deflection signal for producing a difference in current flow through said first and second windings of said push-pull deflection yoke, said third and fourth windings of said transformer and said first and second resistors thereby to deflect said electron beam in accordance with said deflection signal and produce a signal proportional to the actual deflection of the electron beam between said remaining extremities of said first and second resistors.

5. The apparatus for magnetically deflecting the electron beam of a cathode-ray type tube as defined in claim 4 wherein said self-inductance of said third and fourth windings is no less than 10 times said predetermined self-inductance.

6. The apparatus for magnetically deflecting the electron beam of a cathode-ray type tube as defined in claim 4 wherein said third and fourth windings of said transformer have substantially unity coupling therebetween.

7. An apparatus for magnetically deflecting the electron beam of a cathode-ray type tube, said apparatus comprising:

(*a*) a push-pull deflection yoke having first and second input terminals and first and second output terminals, a first winding connected between said first input and output terminals and a second winding connected between said second input and output terminals, said first and second windings having a predetermined self-inductance;

(*b*) first and second resistors of equal ohmic value, each having one extremity thereof connected to a source of substantially fixed reference potential;

(*c*) a transformer having third and fourth windings connected, respectively, from said first and second output terminals of said push-pull deflection yoke to respective remaining extremities of said first and second resistors, said third and fourth windings each having a self-inductance that is substantially greater than said predetermined self-inductance, having substantially unity coupling therebetween and being poled in the same direction whereby the mutual inductance therebetween is positive;

(d) means including first and second transistors having first and second bases, first and second collectors, and first and second emitters, respectively, said first and second collectors being connected to said first and second input terminals of said deflection yoke, and said first and second emitters being connected to a first common junction; and (e) differential amplifier means responsive to a deflection signal and having output leads connected to said first and second bases of said first and second transistors for applying a difference signal representative of said deflection signal thereto.

8. An apparatus for magnetically deflecting the electron beam of a cathode-ray type tube as defined in claim 7, which additionally includes first and second diodes connected from said first and second collectors of said first and second transistors, respectively, to a second common junction, said first and second diodes being poled in a common direction with respect to said second common junction, and means for maintaining said second common junction at a fixed potential level relative to the potential of said first common junction.

No references cited.